3,259,460
PREPARATION OF NITRYL FLUORIDE
Ralph A. Davis and Douglas A. Rausch, Midland, Mich., assignors to The Dow Chemical Company, Midland, Mich., a corporation of Delaware
No Drawing. Filed Apr. 29, 1963, Ser. No. 276,651
3 Claims. (Cl. 23—203)

This invention relates to a novel process for preparing nitryl fluoride ($FNO_2$) and more particularly is concerned with a novel process for preparing nitryl fluoride in high yield without the direct use of elemental fluorine.

It is a principal object of the present invention to provide a novel process for preparing nitryl fluoride in high yields.

It is another object of the present invention to provide a novel and safe process for preparing nitryl fluoride which does not require the direct use of elemental fluorine.

It is a further object of the present invention to provide a process that is not highly exothermic for producing nitryl fluoride.

These and other objects and advantages readily will become apparent from the detailed description presented hereinafter.

In accordance with the present novel process nitryl fluoride is prepared by passing nitrogen tetroxide ($N_2O_4$) over a heated inorganic metal fluoride, cobalt trifluoride ($CoF_3$), silver difluoride ($AgF_2$), manganese trifluoride ($MnF_3$), cerium tetrafluoride ($CeF_4$), or mixtures thereof.

The reaction ordinarily is carried out over a temperature range of from about 25 to about 350° C. Usually, a heated bed of cobalt trifluoride at a temperature of about 300° C. is utilized. However, as above stated with the cobalt trifluoride the process can be carried out at temperatures up to about 350° C.

The relative quantities of metal fluoride and nitrogen tetroxide to be employed at a minimum are about stoichiometric based on the relationship:

$$N_2O_4 + 2M^mF_n \rightarrow 2FNO_2 + 2M^{m-1}F_{n-1}$$

wherein M represents the elements Co, Mn, Ag or Ce and $m$ is the effective charge (i.e., valence state) of the metal in the corresponding metal fluoride reactant and for each element is as follows: Co—3, Ag—2, Mn—3, Ce—4, and $n$ is an integer equal to $m$ for a given metal. Ordinarily, however, excess of the $M^mF_n$ fluorine source is utilized to assure substantially complete conversion of the $N_2O_4$ to $FNO_2$. Ratios of $M^mF_n/N_2O_4$, based on gram moles of the reactants, of from about 10 to about 40 or more preferably are employed.

For most effective conversion, the solid metal fluoride is used in a finely divided state so as to provide a large amount of surface area per unit weight. Ordinarily particles having a maximum size of about 30 mesh U.S. Standard Sieve as determined by standard particle determination sieving techniques are employed. However, satisfactory product preparation results with larger particles, e.g., up to ¼ inch diameter or larger.

The reaction readily is carried out at atmospheric pressures although superatmospheric or subatmospheric pressures can be utilized. However, for ease of operation and maximum in simplicity of equipment atmospheric pressures usually are employed.

As advantage of the present process is that the reduced metal fluoride reactant after reaction readily can be converted back to the higher oxidized state for further reaction. The reforming of the $M^mF_n$ fluoride reactant is accomplished by direct fluorination of the ($M^{m-1}F_{n-1}$) compound with fluorine or a fluorine source, e.g., chlorine trifluoride, at elevated temperatures. To illustrate, cobalt difluoride ($CoF_2$) is substantially quantitatively converted to cobalt trifluoride ($CoF_3$) by treatment with fluorine at a temperature of from about 250–300° C.

In actual practice of the present invention, ready conversion of the nitrogen tetroxide results by continuously passing this gaseous component over an agitated bed of the metal fluoride maintained at the reaction temperature. The product mixture is collected by traditional practices, i.e., condensing in a cooled receiver, absorbing in an inert media, collecting in gas receivers, etc. The nitryl fluoride product then readily can be recovered therefrom.

Alternatively, the process can be carried out in a batch type operation wherein predetermined quantities of the nitrogen tetroxide and metal fluoride are maintained in contact for a period of time at the reaction temperature. Likewise moving or fluid bed techniques and other solid-gaseous manipulation procedures as are understood by one skilled in the art can be employed for carrying out the present novel process.

Reactors, material handling and transfer equipment, storage and collecting vessels and the like for use in carrying out the instant process are to be constructed from materials not detrimentally attacked by the reactants or products. Nickel, nickel alloys, stainless steels, steels, other ferrous based materials and the like are suitable for use in the present process.

The following example will serve to further illustrate the present invention but is not meant to limit it thereto.

*Example*

A tubular Monel reactor about 3 inches inside diameter and about 50 inches long was fitted with a paddle-type coaxial stirrer which rotated at from about 12 to about 16 revolutions per minute. The reactor was packed with nickel shavings at the product exit end to prevent the escape of solids during reaction. The reactor was heated by means of two external electric furnaces, temperature control being maintained by thermocouples placed between the tube and the furnaces.

About 12 gram moles (1391 grams) of finely divided cobalt trifluoride ($CoF_3$) were placed in the reactor and heated to about 300° C. with stirring. After the cobalt trifluoride bed had reached this temperature, about 0.43 gram mole (40 grams) of $N_2O_4$ was passed over the continuously agitated heated bed over a period of about 30 minutes.

The reaction products upon exiting from the reactor were passed into a first receiver cooled by solid carbon dioxide (Dry Ice) and then into a second receiver cooled by liquid nitrogen. The total product yield based on $N_2O_4$ reactants, was about 89 percent $FNO_2$. Distillation of the so-collected product indicated it to be essentially pure $FNO_2$ with only trace amounts of $N_2O_4$ being present therein.

The solid $CoF_2$ product remaining in the reactor was treated with fluorine at a temperature of about 250–300° C. thereby being substantially quantitatively reconverted to cobalt trifluoride ($CoF_3$).

In a manner similar to that described for the foregoing example, substantially stoichiometric quantities of cerium tetrafluoride and nitrogen tetroxide were reacted at a temperature of about 125° C. to prepare nitryl fluoride; manganese trifluoride and nitrogen tetroxide at a gram mole ratio ($MnF_3/N_2O_4$) of about 10 can be contacted together at a temperature of about 225° C. to give nitryl fluoride in high yields; nitrogen tetroxide can be passed over silver difluoride at a gram mole ratio ($AgF_2/N_2O_4$) of about 40 at a temperature of about 35° C. to give the nitryl fluoride.

Various modifications can be made in the present invention without departing from the spirit or scope thereof for it is understood that we limit ourselves only as defined in the appended claims.

We claim:
1. A process for preparing nitryl fluoride which comprises:
   (1) contacting cobalt trifluoride with nitrogen tetroxide over a temperature range of from about 300 to about 350° C., the gram mole ratio of said cobalt trifluoride to said nitrogen tetroxide ranging from about stoichiometric to about 40 and the particle size of said cobalt trifluoride at a maximum being about ¼ inch diameter, and
   (2) recovering nitryl fluoride therefrom.
2. A process for preparing nitryl fluoride which comprises:
   (1) passing nitrogen tetroxide over finely divided cobalt trifluoride at a temperature of about 300° centigrade, the gram mole ratio of said cobalt trifluoride to said nitrogen tetroxide being about 30, and
   (2) recovering the nitryl fluoride product.
3. The process as defined in claim 2 wherein the cobalt trifluoride has a maximum particle size of about 30 mesh U.S. Standard Sieve.

References Cited by the Examiner
UNITED STATES PATENTS

| | | | |
|---|---|---|---|
| 2,076,364 | 4/1937 | Cady | 23—203 |
| 3,043,662 | 7/1962 | Lipscomb | 23—203 |
| 3,185,542 | 5/1965 | Yodis | 23—203 XR |

FOREIGN PATENTS 918,506  9/1954  Germany.

OTHER REFERENCES

The Chemistry of Dinitrogen Tetroxide, 1958, page 1, article by Peter Gray, The Royal Institute of Chemistry.

OSCAR R. VERTIZ, *Primary Examiner.*

BENJAMIN HENKIN, *Examiner.*

B. H. LEVENSON, *Assistant Examiner.*